(12) United States Patent
Sagawa et al.

(10) Patent No.: US 6,452,526 B2
(45) Date of Patent: *Sep. 17, 2002

(54) VIDEO SIGNAL PROCESSING CIRCUIT, VIDEO DISPLAY AND ELECTRONIC EQUIPMENT BOTH USING THE CIRCUIT, AND METHOD OF ADJUSTING OUTPUT OF DIGITAL-ANALOG CONVERTERS

(75) Inventors: Takahiro Sagawa; Chiharu Kaburagi, both of Chino; Takashi Kurumisawa, Shiojiri, all of (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/242,905

(22) PCT Filed: Jun. 30, 1998

(86) PCT No.: PCT/JP98/02919

§ 371 (c)(1),
(2), (4) Date: Feb. 25, 1999

(87) PCT Pub. No.: WO99/00786

PCT Pub. Date: Jan. 7, 1999

(30) Foreign Application Priority Data

Jun. 30, 1997 (JP) .............................. 9-174474

(51) Int. Cl.$^7$ .......................... H03M 1/66; H03M 11/00
(52) U.S. Cl. ....................... 341/144; 341/141; 341/100; 345/98; 345/205
(58) Field of Search .................................. 341/100, 101, 341/144, 141; 345/98, 99, 205, 206, 209

(56) References Cited

U.S. PATENT DOCUMENTS

| | | | | |
|---|---|---|---|---|
| 5,001,480 A | * | 3/1991 | Ferry et al. ................. | 341/144 |
| 5,604,510 A | * | 2/1997 | Blanchard .................... | 345/98 |
| 6,008,801 A | * | 12/1999 | Jeong ........................ | 345/204 |
| 6,049,321 A | * | 4/2000 | Sasaki ........................ | 345/99 |

FOREIGN PATENT DOCUMENTS

| | | |
|---|---|---|
| JP | A-3-157009 | 7/1991 |
| JP | A-3-283638 | 12/1991 |
| JP | A-6-75204 | 3/1994 |

(List continued on next page.)

Primary Examiner—Howard L. Williams
(74) Attorney, Agent, or Firm—Oliff & Berridge, PLC

(57) ABSTRACT

An image signal processing circuit (102) includes a phase-expansion circuit (103), a digital polarity-inversion circuit (104), first to sixth D/A converters (111 to 116), and first to sixth operational amplifiers (151 to 156). The resistance value of the first to sixth amplitude adjusting resistors (121 to 126) which cause the output amplitude of an analog signal output from the first to sixth D/A converters (111 to 116) to be fixed is adjusted by laser trimming. First to sixth gain setting resistors (161 to 166) are connected to the first to sixth operational amplifiers (151 to 156). The first gain setting resistor (161) includes a first resistor (131) and a second resistor (141), and the gain of the operational amplifier (151) is set by the resistance ratio (R2/R1) thereof. In order that this resistance ratio (R2/R1) is fixed for each set, the first resistor (131) and the second resistor (141) are formed on the same substrate by undergoing the same manufacturing process. As a result, there is no need to use the first and second resistors (131, 141) for variable resistors.

16 Claims, 15 Drawing Sheets

| | FOREIGN PATENT DOCUMENTS | | | | |
|---|---|---|---|---|---|
| JP | A-6-82754 | 6/1994 | JP | A-10-171421 | 6/1998 |
| JP | 09-243998 * | 9/1997 | JP | 10-240204 * | 9/1998 |
| JP | A-9-269754 | 10/1997 | WO | WO97/08677 | 3/1997 |
| JP | 09-318928 * | 12/1997 | WO | WO 97/08677 | 6/1997 |
| JP | 10-153986 * | 6/1998 | WO | WO97/49080 | 12/1997 |

* cited by examiner

VIDEO SIGNAL PROCESSING CIRCUIT, VIDEO DISPLAY AND ELECTRONIC EQUIPMENT BOTH USING THE CIRCUIT, AND METHOD OF ADJUSTING OUTPUT OF DIGITAL-ANALOG CONVERTERS

BACKGROUND OF THE INVENTION

1. Field of the Invention

The present invention relates to an image signal processing circuit which converts a serial image signal into parallel form, performs digital-analog conversion on each parallel image signal, and amplifies and outputs it, and a image display apparatus and an electronic apparatus using the image signal processing circuit. Furthermore, the present invention relates to a method of adjusting the amplitude of an analog image signal which is output from a plurality of digital-analog converters. The image signal in the present invention is handled as being equivalent to a picture signal.

2. Description of the Related Art

For example, when performing liquid-crystal display, as the number of pixels of a display screen increases, the transfer frequency of pixel data increases, and the transfer frequency becomes 40 MHz in SVGA (800×600 pixels) having a standard pixel density, and becomes 65 MHz in XGA (1024× 768 pixels) having a high pixel density. Meanwhile, the response frequency of writing to a liquid-crystal element is 7 to 8 MHz when a TFT (Thin Film Transistor) is used as a sampling switch. Therefore, a serial image signal is converted into N parallel signals, and the transfer frequency is lowered by 1/N to a frequency at which response is possible by a TFT (see Japanese Unexamined Patent Publication No. 8-352358, WO97/08677, and WO97/49080).

Here, the serial-parallel conversion of an image signal is called "phase expansion". As shown schematically in FIG. 14, serial input data D has serial image data a1, a2, . . . which are transferred in accordance with a reference clock CLK of, for example, 40 MHz. In the phase-expansion circuit, image data a1, a2, . . . are expanded by a shift register and a latch circuit so that its data transfer cycle becomes six times as high as that of the original, and the phase-expanded image signals D1, D2, . . . D6 are output in parallel.

The method of FIG. 14 is called "six-phase expansion" and is used in the case of SVGA having low pixel density. The writing frequency in this case is 6.7 MHz. Meanwhile, in the case of XGA having a high pixel density, 12-phase expansion is used, and the writing frequency at this time is 5.4 MHz.

A liquid-crystal display apparatus using a conventional image signal processing circuit including this phase-expansion circuit is shown in FIG. 15. In FIG. 15, a scanning signal from a scanning circuit 501 and a data signal from a image signal processing circuit 502 are provided to a liquid-crystal panel 500, causing the liquid-crystal panel 500 to be driven.

The image signal processing circuit 502 comprises a phase-expansion circuit 503, a polarity-inversion circuit 504, digital-analog converters (hereinafter abbreviated as D/A converters) 511 to 516, and operational amplifiers 551 to 556.

Variable resistors 521 to 526 which adjust the output amplitude of an analog signal output from the D/A converters 511 to 516 are connected to parts of output lines 511A to 516A of the D/A converters 511 to 516, respectively. Also, a bias signal line 505 is connected in common to the negative terminals of the operational amplifiers 551 to 556, and the output lines 511A to 516A of the D/A converters 511 to 516 are respectively connected to the positive terminals.

Gain setting resistors 531 to 536, and 541 to 546 are connected to the operational amplifiers 551 to 556, respectively. Of these, the gain setting resistors 541 to 546 are formed of variable resistors.

A case will now be considered in which the same halftone display is performed on the entire screen of the liquid-crystal panel shown in FIG. 15. The outputs of the operational amplifiers 551 to 556 are connected to the respective signal lines along the vertical direction of the liquid-crystal panel 500. For this reason, when, for example, a voltage different from those of the operational amplifiers 552 to 556 is output from only the operational amplifier 551, patterns in the form of longitudinal stripes appear every six lines on the liquid-crystal panel 500, and the display quality is degraded.

Therefore, in the conventional image signal processing circuit 502 shown in FIG. 15, the variable resistors 521 to 526 connected to the D/A converters 511 to 516 and the variable resistors 541 to 546 connected to the operational amplifiers 551 to 556 are each adjusted manually.

In recent years, as the liquid-crystal display screen has become larger, of a higher definition or a color-picture display, the number of pixels tends to increase, and the number of variable resistors shown in FIG. 15 has increased with the increase in the number of pixels.

For example, in a color display of XGA, the number of variable resistors becomes:

12(number of phase expansions)×3(R, G, B)×2(number of variable resistors in one line)=72

Since a number of such variable resistors are required, not only is the cost of parts increased, but also manpower and time are necessary for manual resistance value adjustments. This results in an increased cost of the image signal processing circuit or the liquid-crystal display apparatus. Also, since the adjusted resistance value varies with time, this might cause luminance variations to gradually occur, and improvements must be made from the viewpoint of picture quality.

SUMMARY OF THE INVENTION

Accordingly, an object of the present invention is to provide an image signal processing circuit in which the number of variable resistors is decreased to lessen the operation of adjusting the resistance value, thereby resulting in decreased cost, and a image display apparatus and an electronic apparatus using the image signal processing circuit.

Another object of the present invention is to provide an image signal processing circuit in which automatic adjustment of the resistance value is made possible and the occurrence of luminance variation with time can be prevented, and an image display apparatus and an electronic apparatus using the image signal processing circuit.

A further object of the present invention is to provide an image signal processing circuit in which the mounting area of resistors is reduced and further, a S/N ratio can be improved and radiation noise can be reduced, and an image display apparatus and an electronic apparatus using the image signal processing circuit.

Still a further object of the present invention is to provide a method capable of adjusting quickly and accurately the output amplitude of a plurality of digital-analog converters.

An image signal processing circuit in accordance with the present invention provides an image signal processing circuit, comprising:

a serial-parallel converter for converting a serial digital image signal into N parallel digital image signals;

N digital-analog converters for converting the N parallel digital image signals into respective analog image signals;

N amplifiers for amplifying and outputting the analog image signals from the N digital-analog converters, respectively; and N sets of gain setting resistors, connected to the respective N amplifiers, for setting respective gains of the N amplifiers, wherein each of the N sets of gain setting resistors includes first and second resistors, and the first and second resistors are formed on a first substrate in the same manufacturing step so that the resistance value of each of the N sets of gain setting resistors need not be adjusted.

In the present invention, the resistance ratio of the first and second resistors which constitute a gain setting resistor is substantially the same for each set without requiring any adjustment. Since the first and second resistors are formed on the same substrate in the same manufacturing step, manufacturing is possible with high accuracy in such a manner as to be dependent upon, for example, mask accuracy during exposure. When the resistance ratio of the first and second resistors of each set is substantially the same, the gain of N amplifiers becomes substantially the same without requiring any adjustment. Therefore, it is possible to prevent luminance variations in the form of longitudinal stripes from occurring for each of the parallel output lines on the display screen.

It is possible to further provide N amplitude adjusting resistors, connected to respective output lines of N digital-analog converters, for adjusting the amplitude of each analog image signal. In this case, each resistance value of each of N amplitude adjusting resistors is adjusted by laser trimming.

As a result of the above, the amplitude of the respective analog image signals which are input to N amplifiers is substantially the same. Also from this fact, it is possible to prevent luminance variations in the form of longitudinal stripes from occurring for each parallel output line on the display screen. In particular, when compared to a conventional technology that manually adjusts a moving part of a variable resistor by means of a jig, because the automatic adjustment of a resistance value becomes possible, an operation load of a laser-trimmed resistor is reduced greatly. Also, since resistance value variations with time do not occur in the laser-trimmed resistor, there is no such occurrence of luminance variation with time and degradation of image quality.

In the present invention, it is possible to provide a digital polarity-inversion circuit between a serial-parallel converter and N digital-analog converters, or an analog polarity-inversion circuit between N digital-analog converters and N amplifiers.

In this case, each of the N amplifiers is formed by an operational amplifier having first and second input terminals, an analog image signal is input to the first input terminal of the operational amplifier, and a polarity-inverting bias signal is input to the second input terminal of the operational amplifier.

As a result of the above, since the level-shift amount of the polarity-inverting bias signal is determined by the resistance ratio of the first and second resistors, the level-shift amount can be substantially the same with respect to N amplifiers.

It is possible to form k (1<k≦N) sets of gain adjusting resistors on the first substrate. In other words, it is possible to form the first and second resistors which constitute two or more sets of gain adjusting resistors on the first substrate. As a result of the above, the accuracy of the resistance ratio of k sets of gain adjusting resistors is further improved.

The first substrate and k sets of gain adjusting resistors preferably include a circuit package (a first circuit package) which is housed inside a resin mold with a plurality of terminals (first terminals) connected to the k sets of gain adjusting resistors being exposed. As a result of the above, the influence of environmental variations upon the resistance ratio of the k sets of gain adjusting resistors is reduced.

It is possible to form k amplifiers into a hybrid IC by providing a second circuit package which is housed inside a resin mold with a plurality of second terminals connected to k amplifiers being exposed, and a main substrate which mounts the first circuit package and the second circuit package. This main substrate has wiring patterns formed on both sides and a plurality of through holes which pass through the main substrate. The first circuit package is mounted on one side of the main substrate, the second circuit package is mounted on the other side, and a plurality of first and second terminals are connected to each other through the plurality of through holes. As a result of the above, the wiring that connects the amplifiers to the gain setting resistors does not intersect, and further, the wiring length can be shortened. Therefore, noise is not easily superposed onto the wiring that connects the amplifiers to the gain setting resistors, causing the S/N ratio to be improved. Furthermore, a high-frequency wave is not easily radiated from the wiring that connects the amplifiers to the gain setting resistors, making it possible to reduce the influence of noise upon peripheral circuits.

The first circuit package and the second circuit package are preferably mounted at opposing positions with the main substrate in between. The length of wiring that connects the amplifier to the gain setting resistor can be minimized.

It is preferable that k digital-analog converters and k amplitude adjusting resistors be housed within a third circuit package and the third circuit package be mounted on the main substrate. As a result of the above, the image processing circuit can be formed into an even smaller size.

In another embodiment of the present invention, k (1<k ≦N) first resistors may be formed on a first substrate in the same manufacturing step, and k second resistors may be formed on a second substrate in the same manufacturing step. As a result of the above, each resistance value of the k first resistors becomes substantially the same, and each resistance value of the k second resistors becomes substantially the same. As a result, the resistance ratio of k sets of gain setting resistors can be substantially the same.

The image display circuit of the present invention comprises an image signal processing circuit having the above-described construction, and an electro-optical device driven in accordance with an analog image signal output from this image signal processing circuit. The electronic apparatus of the present invention comprises this image display apparatus. On the display screens of these, luminance variations in the form of longitudinal stripes do not occur for each of the parallel output lines.

The present invention provides a method of adjusting an amplitude of an analog image signal output from each of a plurality of digital-analog converters, the method comprising the steps of:

a first step of laser-trimming a first load resistor connected to an arbitrary first digital-analog converter from among the plurality of digital-analog converters; and a second step of laser-trimming a second load resistor connected to an arbitrary second digital-analog converter from among the plurality of digital-analog converters, wherein the first step includes a step in which the first load resistor is laser-trimmed so that an output voltage from the first digital-analog converter when a predetermined digital signal is input to the first digital-analog converter is within a first allowable range, and the second step includes a step in which the second load resistor is laser-trimmed so that the potential difference between respective output voltages from the first and second digital-analog converters when the predetermined digital signal is input to the first and second digital-analog converters is within a second allowable range.

According to the method of the present invention, an output of the first digital-analog converter, which is a reference, and an output of the second digital-analog converter, which is an object for adjustment, are measured at the same time under equal environment temperature conditions. Therefore, it is possible to start laser trimming without waiting for the characteristics of the N digital-analog converters and the N amplitude adjusting resistors to reach temperature saturation.

DETAILED DESCRIPTION OF PREFERRED EMBODIMENTS

The present invention will be described below with reference to the drawings.

(Description of a Image Display Apparatus)

Figure 1:
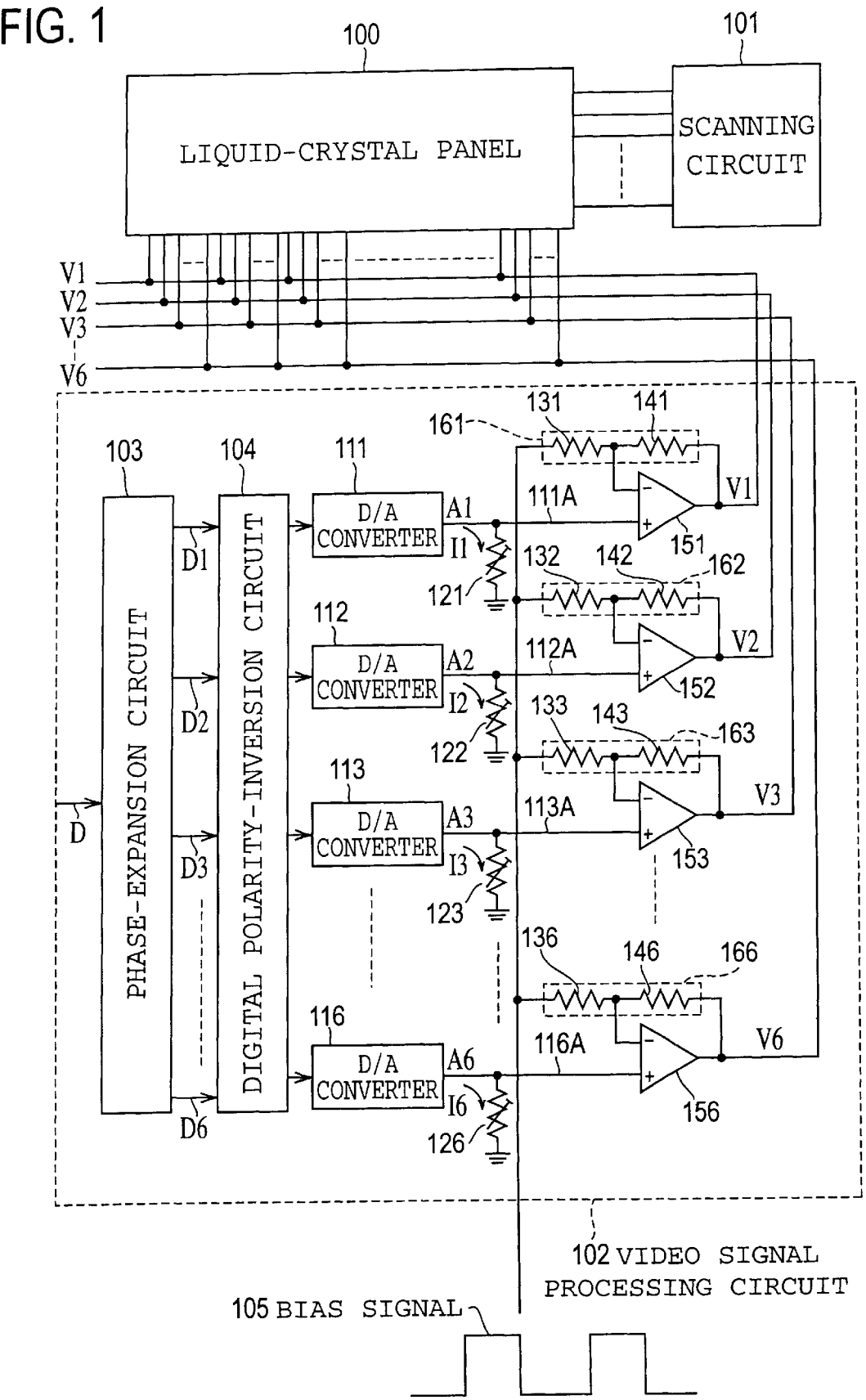
FIG. 1 is a block diagram of a liquid-crystal display apparatus including an image signal processing circuit according to the present invention.

FIG. 1 is a block diagram of a liquid-crystal display apparatus, which is an example of a image display apparatus of the present invention. This liquid-crystal display apparatus, as an example of an electro-optical apparatus, comprises a liquid-crystal panel 100, a scanning circuit 101, and an image signal processing circuit 102.

The image signal processing circuit 102 comprises a phase-expansion circuit (serial-parallel conversion circuit) 103, a digital polarity-inversion circuit 104, first to sixth digital-analog converters 111 to 116, and first to sixth operational amplifiers 151 to 156.

Between the output lines 111A to 116A of the first to sixth D/A converters 111 to 116 and GND terminals, first to sixth amplitude adjusting resistors 121 to 126 for adjusting the output amplitude of an analog signal output from the first to sixth D/A converters 111 to 116 are connected. Also, a bias signal 105 is input to the negative terminals of the first to sixth operational amplifiers 151 to 156, and each of the output lines 111A to 116A of the first to sixth D/A converters 111 to 116 is connected to the positive terminal.

First to sixth gain setting resistors 161 to 166 are connected to the first to sixth operational amplifiers 151 to 156, respectively. Here, the first operational amplifier 151 is used as an example. The first gain setting resistor 161 connected to the first operational amplifier 151 includes a first resistor 131 and a second resistor 141, and the gain of the operational amplifier 151 is set by their respective resistance values.

Here, the resistance value of the first resistor 131 which is an input resistor is denoted as R1 and the resistance value of the second resistor 141 which is a feedback resistor is denoted as R2. If an input to the positive terminal of the operational amplifier 151 is denoted as Vin and an input to the negative terminal as Vbias, an output Vout of the operational amplifier 151 is as expressed in equation (1) below:

$$V\text{out} = (1 + R2/R1) \cdot V\text{in} + (R2/R1) \cdot V\text{bias} \qquad (1)$$

Similarly, the second to sixth gain setting resistors 162 to 166 also include first resistors 132 to 136 and second resistors 142 to 146, respectively.

(Description of the Operation of the Image Signal Processing Circuit)

Figure 14:
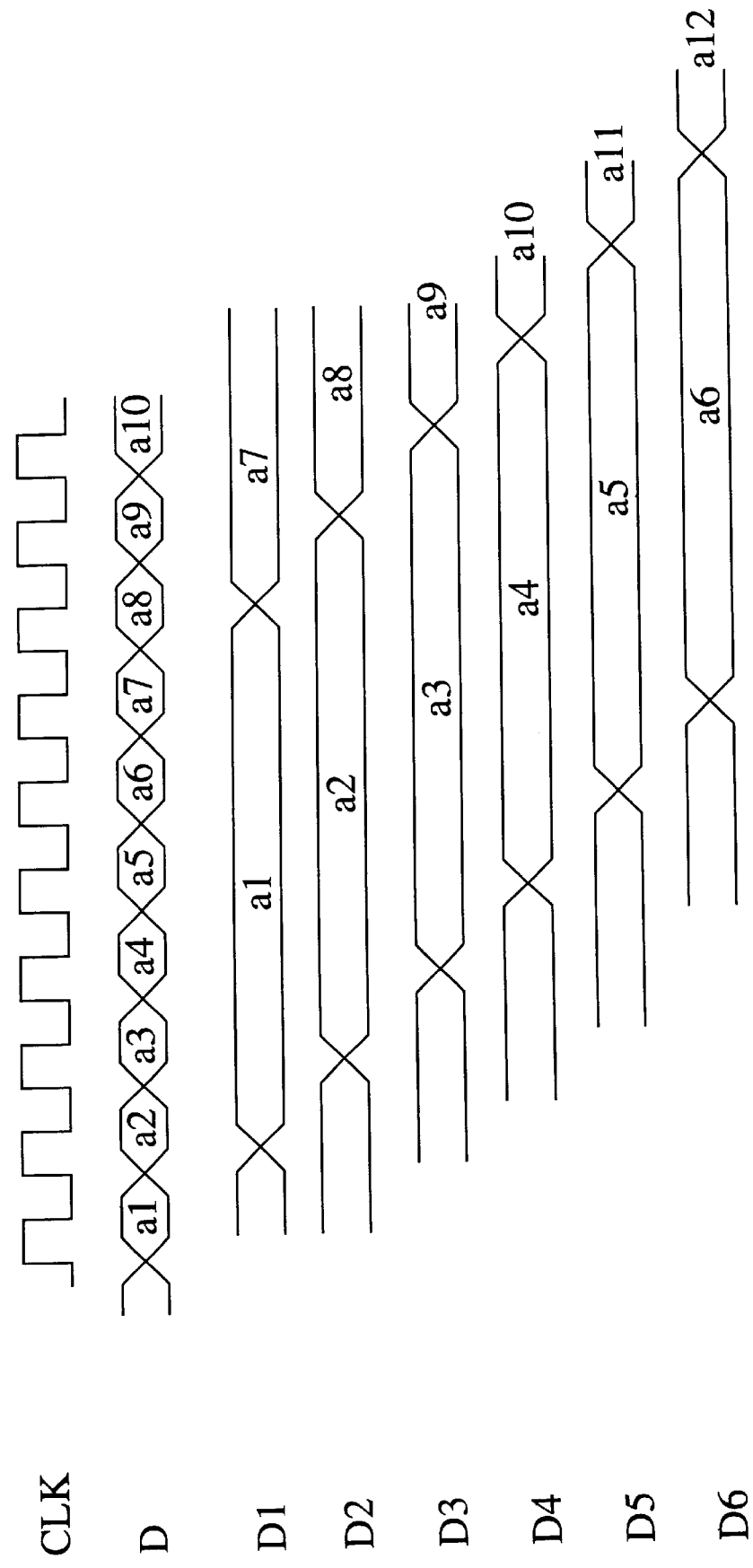
FIG. 14 is a diagram schematically showing parallel-serial conversion.
Figure 15:
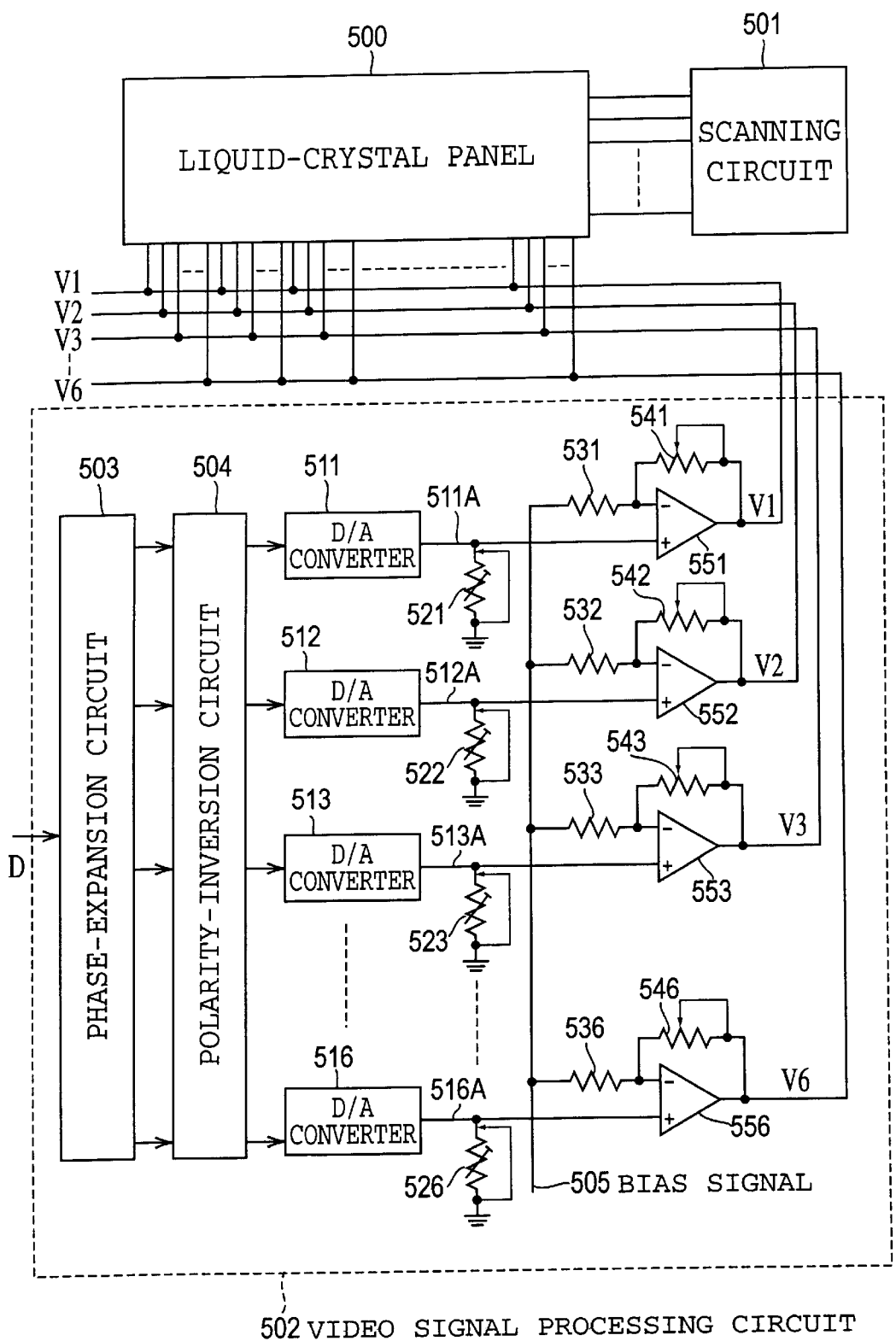
FIG. 15 is a block diagram of a conventional liquid-crystal display apparatus.

In the phase-expansion circuit 103 shown in FIG. 1, as shown in FIG. 14, a serial digital image signal D is phase-expanded (serial-parallel converted) into parallel digital image signals D1 to D6. The digital image signals D1 to D6 are each a signal indicating the gray scale level of an picture by, for example, eight bits.

Each operation of polarity inversion, D/A conversion, and amplification is described with reference to FIGS. 8(A) to 8(C).

Figure 8A:
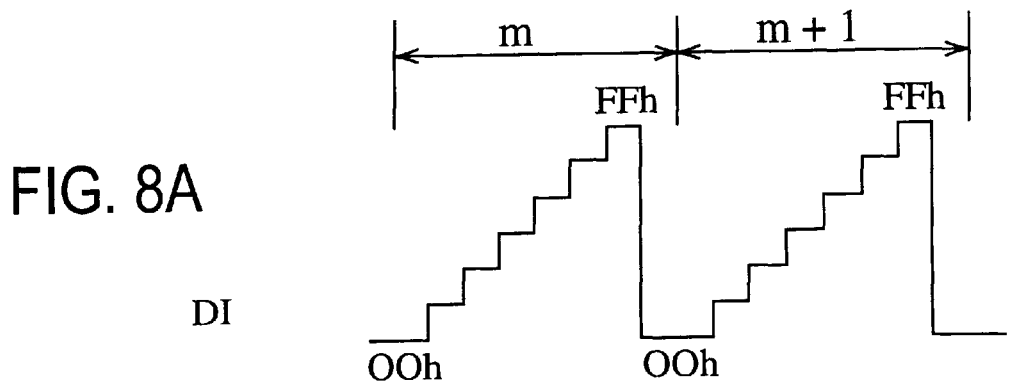
FIGS. 8(A), 8(B), and 8(C) are diagrams schematically showing a phase-expanded digital image signal, a polarity-inversion signal, and an amplified analog image signal.

FIG. 8(A) schematically shows, for example, a digital image signal D1, and also shows a signal whose gray scale value varies in a stepwise manner from 00h to FFh in terms of a hexadecimal value within each frame. In FIG. 8(A), for the sake of description, the gray scale value is shown in an analog manner.

The polarity of the digital image signal D1 shown in FIG. 8(A) is inverted in a digital manner by the digital polarity-inversion circuit 104. Here, the polarity of the digital image signal D1 is inverted for each horizontal scanning period. Meanwhile, in a similar manner, the polarity of the digital image signals D2 to D6 (not shown) is also inverted for each horizontal scanning period. The voltage level of the bias signal 105 is inverted in synchronization with the inversion of the polarity of the image signal. For example, when D1' is in the m-th horizontal scanning period, the bias signal 105 is inverted to a high level, and when it is in the (m+1)th horizontal scanning period, is changed to a low level. As a result of the above, an output V1 becomes as in FIG. 8(C). When the liquid-crystal panel 100 is AC-driven (line-inversion driven) with the polarity being inverted for each horizontal scanning period, the digital image signals D1, D2, . . . are output in such a manner that the image signals output in parallel are made to have the same polarity, and when the liquid-crystal panel 100 is AC-driven (dot-inversion driven) with the polarity being inverted for each display dot, the polarities of the image signals D1 to D6 output in parallel are alternately inverted.

Figure 8B:
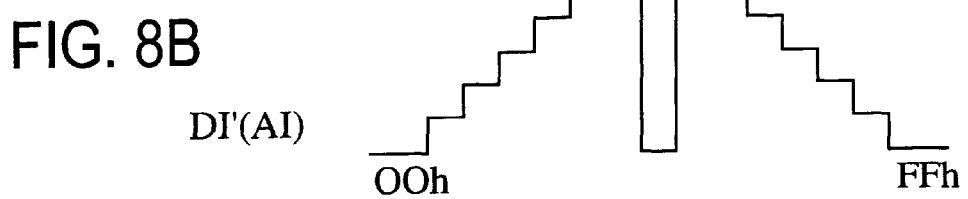

The signal D1' such that the polarity of the digital image signal D1 is inverted for each horizontal scanning period is as in FIG. 8(B). In FIG. 8(B), the polarity of the signal of the m-th horizontal scanning period is not inverted, and the polarity of the signal of the (m+1)th horizontal scanning period is inverted.

The term "polarity" referred to herein is the direction of the electrical field applied to the pixels of the liquid-crystal panel 100. The inversion of the polarity of the signal means that the phase of the signal is changed so that the direction of the electrical field applied to the pixels is reversed.

Here, as a method of digital polarity inversion, for example, the following two methods may be employed. One method is the inversion of the logic of a digital value, for example, converting 2-bit data (1, 1) into (0, 0). The other method is to obtain the two's complement of a digital value which is a binary, for example, converting 2-bit data (1, 1) into (0, 1). As a result of the above, the digital image signal D1 shown in FIG. 8(A) is converted into the digital image signal D1' shown in FIG. 8(B). When the liquid-crystal panel 100 is an active-matrix-type liquid-crystal panel and when the pixel switch is formed of a thin film transistor (TFT), the polarity of the voltage applied to the pixel is inverted with respect to the electrical potential of opposing (common) electrode being a reference. When a MIM (metal-insulator-metal) is used for the pixel switch, the polarity of the voltage applied to the pixel is inverted with respect to the median electrical potential of the amplitude of the analog image signals output from the amplifiers 151 to 156 as a reference.

A digital image signal D1' schematically shown in FIG. 8(B) is input to the D/A converter 111 shown in FIG. 1, and this signal is converted from digital into analog form and output. This analog signal A1 may be considered to be similar to the digital image signal D1' schematically shown in FIG. 8(B).

An amplitude adjusting resistor 121 shown in FIG. 1 adjusts the amplitude A of the signal A1 shown, for example, in FIG. 8(B). When the same digital signal is input to each of the D/A converters 111 to 116, the resistance value of each of the amplitude adjusting resistors 121 to 126 is adjusted so that analog signals A1 to A6 having substantially the same amplitude are input to the amplifiers 151 to 156. The method of adjusting the resistance value of the amplitude adjusting resistors 121 to 126 will be described later.

In the amplifier 151 shown in FIG. 1, the analog signal A1 whose amplitude is adjusted is input to the positive terminal thereof, the bias signal 105 is input to the negative terminal, and a signal V1 amplified in accordance with equation (1) is output. This signal V1 is shown in FIG. 8(C).

Figure 8C:
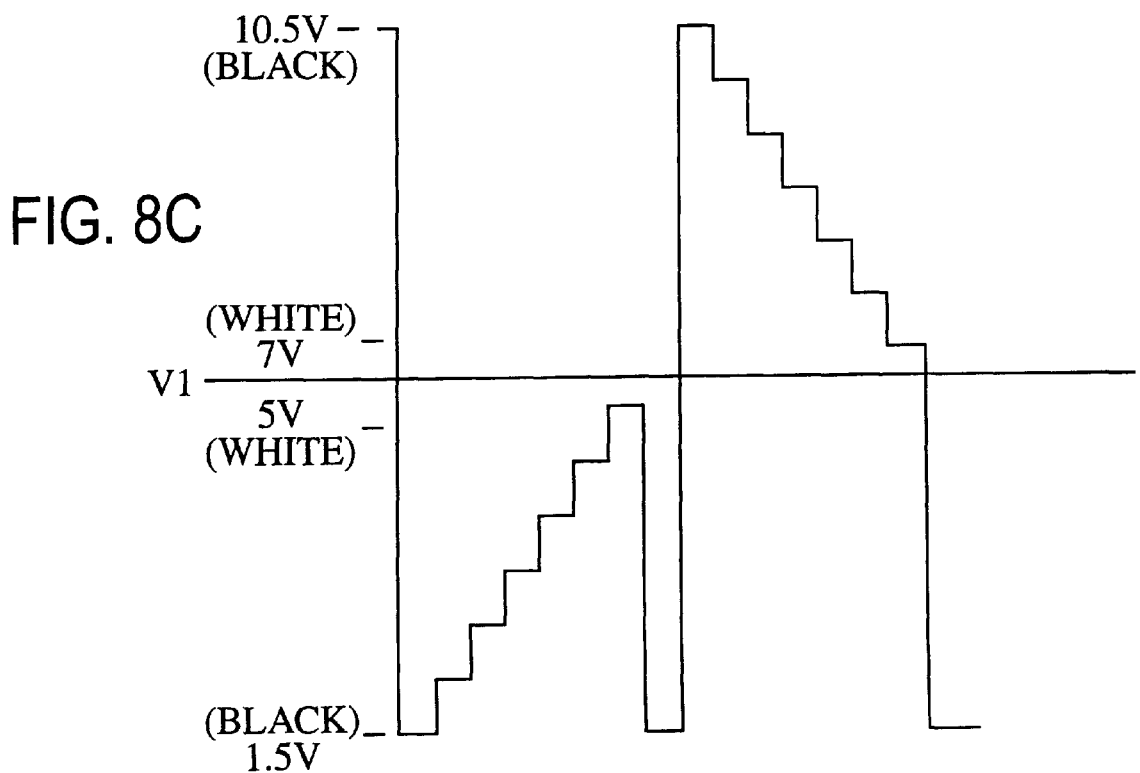

As shown in FIG. 8(C), the black level of the signal V1 is 1.5 V and the white level is 5 V during driving at a first polarity in the m-th horizontal scanning period, and during driving at a second polarity in the (m+1)th horizontal scanning period, the black level of the signal V1 is 10.5 V and the white level is 7 V.

Here, as is clear from equation (1), the gain with respect to the analog signal A1 is (1+R2/R1), and the gain with respect to the bias signal 105 is (R2/R1). Therefore, it can be seen that the gain of the amplifier 151 depends upon only the resistance ratio (R2/R1) irrespective of the absolute values of the resistance value R1 and the second resistance value R2 of the first resistor 131. Therefore, if the resistance ratio (R2/R1) is fixed in the amplifiers 151 to 156, the gain of the amplifiers 151 to 156 can be fixed.

In this embodiment, the construction is formed such that the resistance ratio (R2/R1) is fixed in the amplifiers 151 to 156, and the resistance values of the first resistors 131 to 136 and the second resistors 141 to 146 are not variable, but fixed.

For this reason, the first resistor 131 and the second resistor 141, which are a pair, are formed on the same substrate by using the same manufacturing step. As a result of the above, the resistance layers which are constituents of the first and second resistors 131 and 141 are formed into nearly the same thickness by the same material, and further, its width and length can be secured with high accuracy in such a manner as to be dependent upon the mask accuracy. Therefore, the accuracy of the resistance ratio (R2/R1) of the resistance value (R1) of the first resistor 131 to the resistance value (R2) of the second resistor 141 is improved. By forming other sets of the first resistors 132 to 136 and the second resistors 142 to 146 in a similar manner, the resistance ratio (R2/R1) of the first and second resistors, being pairs, can be formed with high accuracy. As a result, the resistance ratio (R2/R1) of the gain setting resistors 161 to 166 of each set which are connected to the operational amplifiers 151 to 156, respectively, can be substantially the same.

Here, for the manufacturing step of the first and second resistors, technology that is established in a semiconductor manufacturing process can be used. For example, a polycrystalline silicon layer is formed on an insulation substrate, and ions are doped to form a resistance layer. Thereafter, when a lithographic step is performed to carry out resist coating, exposure, development, and etching for patterning, it is possible to manufacture first and second resistors having a fixed resistance ratio (R2/R1). Also, by forming a resistance layer by doping ions onto the surface of a semiconductor substrate and by forming a polycrystalline silicon resistance layer on an insulation layer on a semiconductor substrate, it is possible to manufacture first and second resistors having a fixed resistance ratio.

(Investigation of the Influence on Image Quality Due to Differences in Gain of Each Amplifier)

In the example shown in FIG. 8(C), when driving by applying a voltage to each pixel of the liquid-crystal panel 100, the applied voltage difference between white display and black display is 3.5 V. When gray scale data is the general eight bits, a 256-gray scale display is made, and the potential difference for each gray scale is 3.5 V÷256≈14 mV.

Here, since human vision has logarithmic characteristics, it is difficult to distinguish a one-gray scale difference in a white area, but in a display area from halftone to black, a one-gray scale difference can be distinguished. Therefore, if a potential difference of 14 mV or more is generated between the output from the operational amplifier 151 and that of the others when the digital gray scale input value is a 50% input value (halftone display), luminance variations occur longitudinally at intervals. In the above case, when the digital gray scale input value is a 100% input value (black display), the output from the operational amplifier 151 has a potential difference of 28 mV or more from the others, and luminance variations during black display are more conspicuous.

Meanwhile, in general, D/A converters have output variations of approximately ±3%, and the maximum relative error is 6%. For this reason, the potential difference between the outputs of two D/A converters reaches as much as 3.5 V×0.06=210 mV at a maximum. Therefore, unless output adjustments are made, luminance variations become considerably conspicuous.

Here, in order to prevent luminance variations, an output error between each pair of operational amplifiers at the time of a 100% input value needs to be suppressed to within (28 mV/3.5 V)×100=0.8%. Since the output between each pair of operational amplifiers depends upon the resistance ratio (R2/R1) as described above, the error of the resistance ratio (R2/R1) of the gain setting resistors 161 to 166 of each set needs to be suppressed to within 0.8%.

In this embodiment, since the first and second resistors which constitute the gain setting resistors 161 to 166 of each set are manufactured in such a manner as to be dependent upon the accuracy of the already established semiconductor manufacturing technology as described above, it is possible to suppress the error of the resistance ratio (R2/R1) of the gain setting resistors 161 to 166 of each set to within 0.8%. In actuality, in this embodiment, the resistance ratio (R2/R1) could be ±0.05%. Therefore, the maximum relative error between the operational amplifier outputs could be suppressed to 0.1%, and luminance variations could be eliminated.

However, in order to obtain this result, it is required that the voltage amplitude of the analog signal A1 input to the operational amplifiers 151 to 156 be nearly constant. For this purpose, in this embodiment, the resistance values of the amplitude adjusting resistors 121 to 126 can be adjusted in the manufacturing step. This adjustment method will be described later.

(Description of a Hybrid IC)

Figure 2:
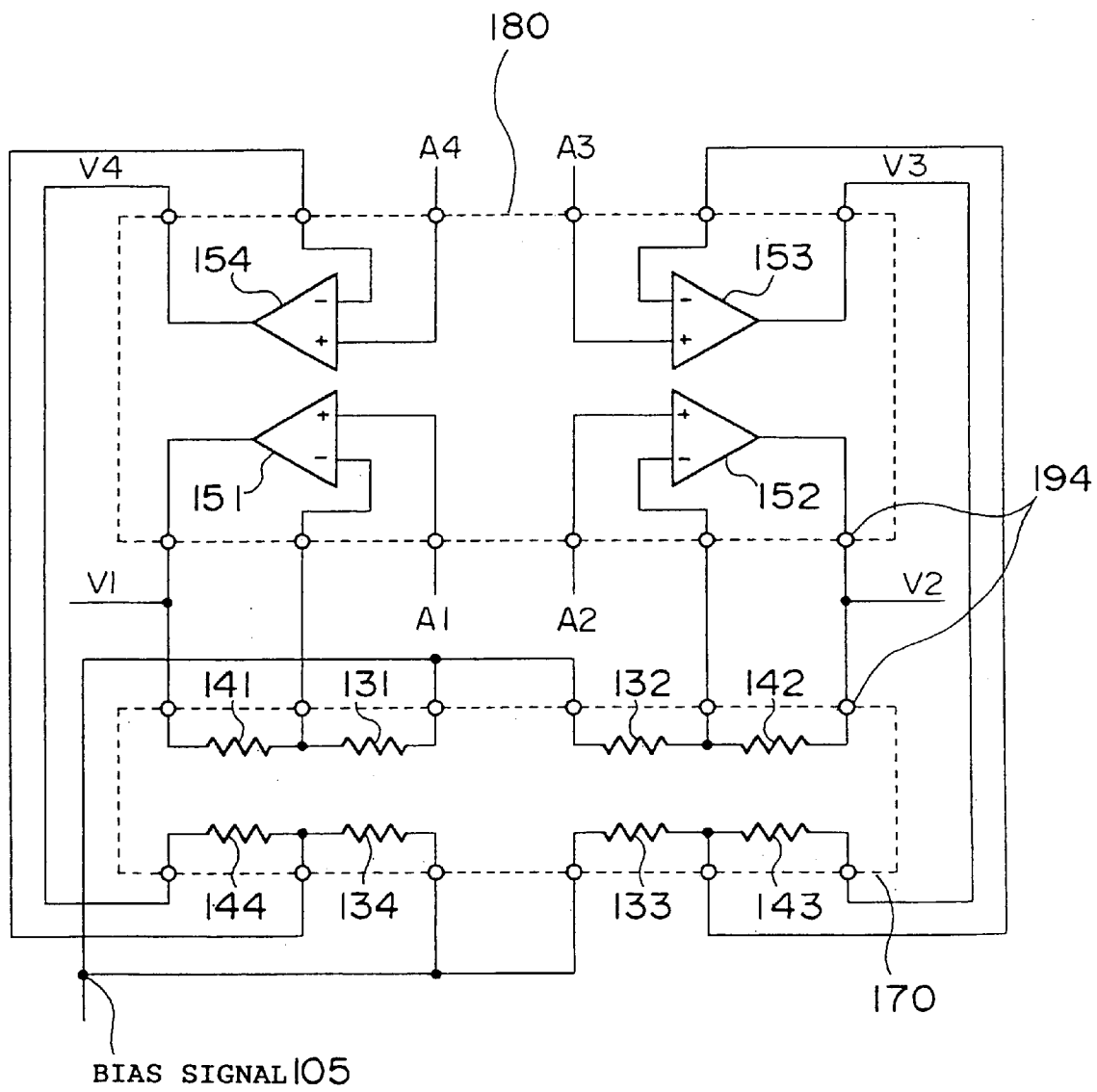
FIG. 2 is a circuit diagram showing a connection between a first circuit package having mounted therein k sets of gain setting resistors, and a second circuit package having mounted therein k amplifiers, of the image signal processing circuit shown in FIG. 1.
Figure 3:
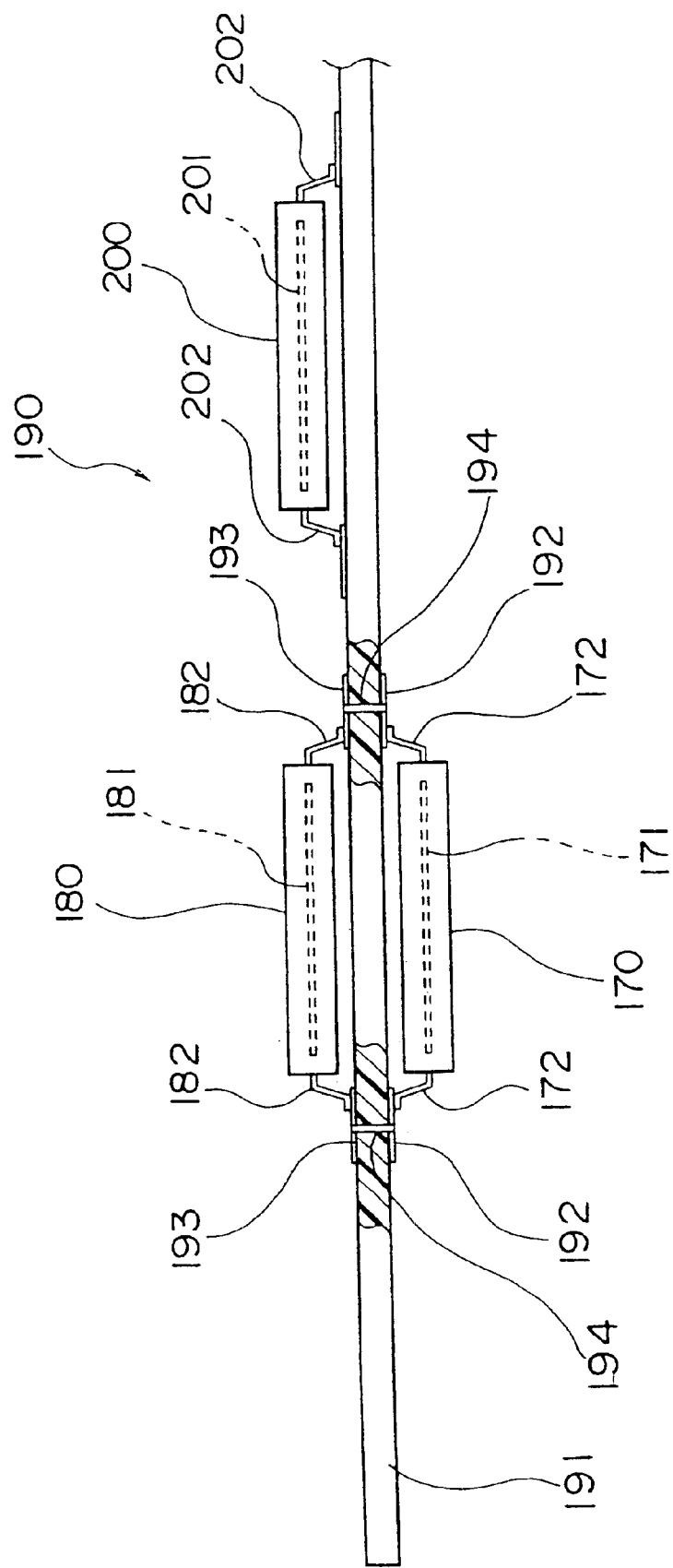
FIG. 3 is a side view of a hybrid IC having mounted therein first and second circuit packages shown in FIG. 2.

FIG. 2 is a circuit diagram of first to fourth operational amplifiers 151 to 154, and first to fourth gain setting resistors 161 to 164 connected thereto, of the image signal processing circuit 102 shown in FIG. 1. FIG. 3 is a side view of a hybrid IC 190 in which the image signal processing circuit 102 shown in FIG. 1 is mounted.

As shown in FIG. 3, the first to fourth gain setting resistors 161 to 164 are formed on a first substrate 171 by using semiconductor manufacturing technology such as that described earlier, and are housed within a first circuit package 170 which is resin molded. The first resistors 131 to 134 and the second resistors 141 to 144 which constitute the first to fourth gain setting resistors 161 to 164 are connected to a first terminal 172 exposed from the first circuit package 170.

Meanwhile, the first to fourth operational amplifiers 151 to 154 are formed on a second substrate (semiconductor substrate) 181 shown in FIG. 3 by using a semiconductor manufacturing process and are housed within a second circuit package 180 which is resin molded. The first to fourth operational amplifiers 151 to 154 are connected to a second terminal 182 exposed from the second circuit package 180.

These first and second circuit packages 170 and 180 are mounted onto a main substrate 191 shown in FIG. 3. Furthermore, the first circuit package 170 is mounted onto the rear surface of the main substrate 191, and the second circuit package 180 is mounted onto the opposite surface of the main substrate 191 in such a manner as to oppose the first circuit package 170.

As shown in FIG. 3, a rear-surface wiring pattern 192, an opposite-surface wiring pattern 193, and a plurality of through holes 194 that connect the wiring patterns 192 and 193 on the opposite and rear surfaces are formed on the main substrate 191 of the hybrid IC 190.

Further, a first terminal 172 of the first circuit package 170 is connected to the wiring pattern 192, and a second terminal 182 of the second circuit package 180 is connected to the wiring pattern 193.

As a result, as shown in FIG. 2, the first to fourth operational amplifiers 151 to 154 and the first to fourth gain setting resistors 161 to 164 can be connected to each other through the wiring patterns 192 and 193 and the through holes 194.

Although in this embodiment the first circuit package 170 is constructed by mounting k=4 sets of gain setting resistors 161 to 164, the number of gain setting resistors to be mounted onto the first circuit package 170 may be changed. Of course, it is possible to mount all the six sets of gain setting resistors shown in FIG. 1 onto the first circuit package 170.

It is also possible to further mount a third circuit package 200 to the hybrid IC, as shown in FIG. 3. In this third circuit package 200, for example, first to sixth D/A converters 111 to 116 formed on a third substrate (semiconductor substrate) 201, and amplitude adjusting resistors 121 to 126 connected thereto, are housed and resin-molded in a state in which a third terminal 202 is exposed.

In addition, the phase-expansion circuit 103 or the digital polarity-inversion circuit 104 may also be contained within the hybrid IC 190.

Here, when the construction such as shown in FIG. 3 is formed, in comparison with a case in which a second resistor of the gain setting resistors is mounted as a variable resistor on a substrate as in a conventional case, a smaller space of each stage can be achieved. Therefore, this is advantageous when this liquid-crystal display apparatus is contained within a small apparatus.

With the construction of FIG. 3, the length of wiring which connects the operational amplifiers to the gain setting resistors is minimized. Therefore, the risk that noise might be superposed onto the wiring which connects the operational amplifiers to the gain setting resistors is reduced, and the S/N ratio is improved. Furthermore, a high-frequency wave is not radiated from the wiring which connects the operational amplifiers to the gain setting resistors, and the influence of noise upon peripheral circuits is reduced.

(Modification of the Hybrid IC)

Figure 4:
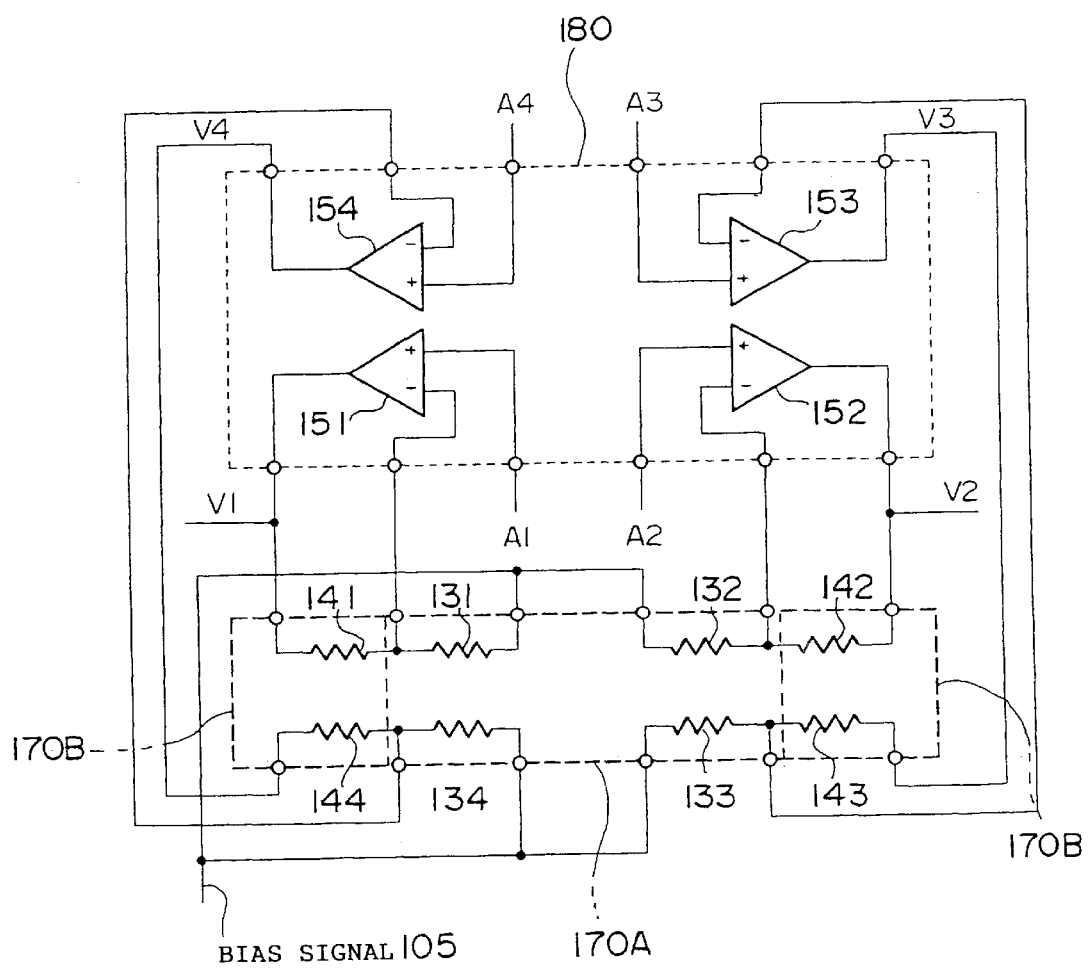
FIG. 4 is a circuit diagram showing a modification of FIG. 2.

Unlike FIG. 2, FIG. 4 shows a modification in which the first resistors 131 to 134 are mounted to a first circuit package 170A and the second resistors 141 to 144 are mounted to a second circuit package 170B. Furthermore, the operational amplifiers 151 to 154 are mounted to a third circuit package 180C.

As a result of this, since the first resistors 131 to 134 are manufactured by undergoing the same manufacturing process, each of their resistance values becomes substantially the same. In a similar manner, since the second resistors 141 to 144 are also manufactured by undergoing the same manufacturing process, each of their resistance values becomes substantially the same. As a result, the resistance ratio (R2/R1) of the resistance value R1 of the first resistors 131 to 134 to the resistance value R2 of the second resistors 141 to 144 can be nearly constant. Therefore, the gains of the operational amplifiers 151 to 154 can be nearly fixed. The first circuit package 170A and the second circuit package 170B are mounted side by side at the position of 170 shown in FIG. 3.

(The Construction of the Amplitude Adjusting Resistor and the Method of Adjusting its Resistance Value)

For the D/A converters 111 to 116 shown in FIG. 1, current-output-type D/A converters are used with amplitude adjusting resistors 121 to 126 being connected as load resistors. Therefore, constant currents I1 to I6 which are proportional to the input data value flow to the amplitude adjusting resistors 121 to 126, and output voltages A1 to A6 equal to the product of the resistance value and the constant current value can be obtained. That is, the D/A converters 111 to 116 become constant current sources which output current proportional to the input digital signal.

Figure 5:
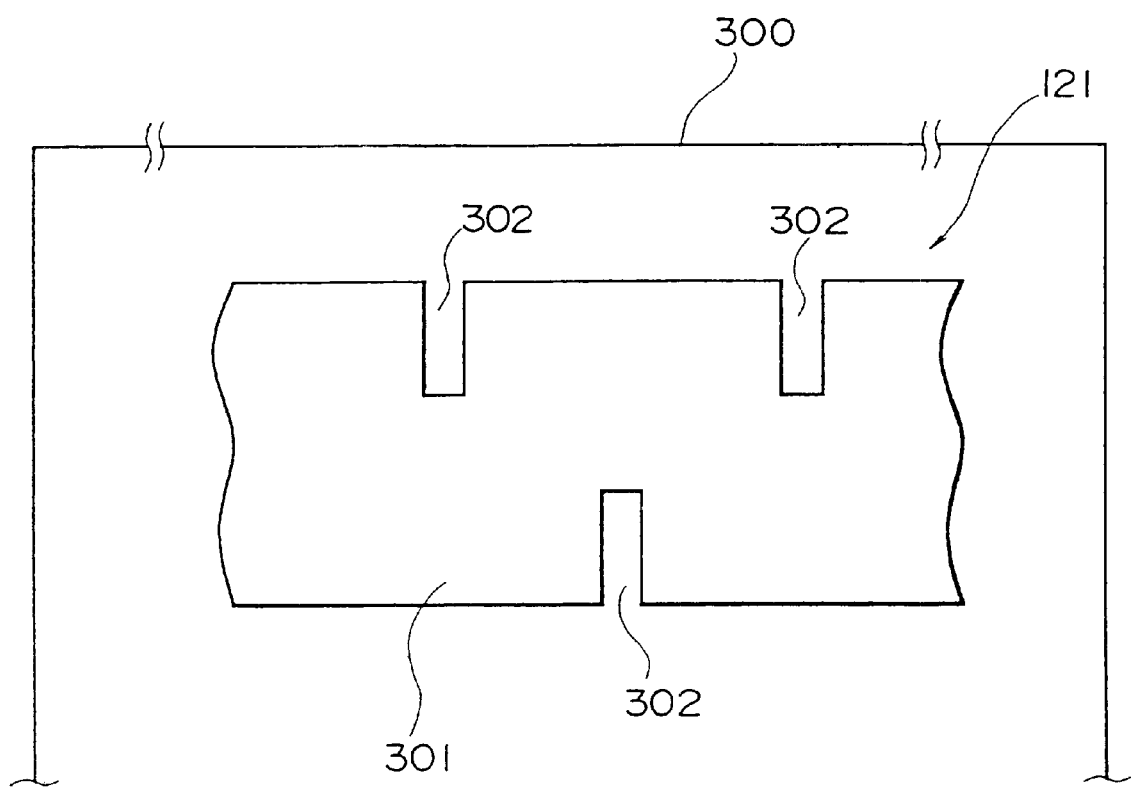
FIG. 5 is a plan view of a laser-trimmed amplitude adjusting resistor.

Here, the amplitude adjusting resistors 121 to 126 have the shape shown in FIG. 5. FIG. 5 shows the laser-trimmed amplitude adjusting resistor 121. This amplitude adjusting resistor 121 comprises a resistance layer 301, made of polycrystalline silicon, formed on an insulating substrate or semiconductor substrate 300, and a plurality of cutouts 302 are formed by laser trimming alternately on the opposing side of the resistance layer 301. Each of the resistance layers 301 which form the amplitude adjusting resistors 121 to 126 are formed by a semiconductor manufacturing technology in such a manner that they have the same material, the same thickness, the same length, and the same width. Therefore, each resistance value of the resistance layers 301 which form the amplitude adjusting resistors 121 to 126 differs depending upon the number of and the size of the cutouts 302 shown in FIG. 5. Since the more the number or the size is increased, the less the substantial cross section area of the resistance layers is decreased, the resistance value is increased. For this reason, if the initial resistance value of the amplitude adjusting resistors 121 to 126 is set to be lower than the resistance value actually required, it is possible to obtain a desired resistance value by laser trimming.

Next, a description will be given of a method of laser-trimming the resistance layer 301 shown in FIG. 5. At first, a digital signal which is a 100% input value is input to all the first to sixth D/A converters 111 to 116 shown in FIG. 1, and the output voltages A1 to A6 obtained through the respective amplitude adjusting resistors 121 to 126 are monitored. If there are variations in the monitored output voltages A1 to A6, laser trimming is performed on the amplitude adjusting resistors 121 to 126 so that the potential difference between them becomes within that of a predetermined range. This laser trimming step is automated by feedback control, and adjustments are terminated accurately and in a short time.

Here, the variation of the output voltage after being laser-trimmed by using an existing laser device is ±0.1%, and the total variation, including environmental variation, can be kept to ±0.3% (0.6% in terms of the maximum relative error).

From the above, since the maximum relative error between D/A conversion outputs is 0.6% and the maximum relative error between operational amplifier outputs is 0.1%, the maximum relative error between each pair of lines becomes 0.7%. Therefore, it is possible to obtain a value within the target 0.8% described earlier.

Here, as shown in FIG. 3, if the amplitude adjusting resistors 121 to 126 are housed within the third circuit package 200, resistance to environment is improved, yielding the advantage that the variations of the output voltages of the operational amplifiers 151 to 156 can be further reduced.

It is a matter of course that even if voltage-output-type D/A converters are used as D/A converters, the above-described adjustment is possible.

(Modification of the Laser Trimming Method)

Figure 6:
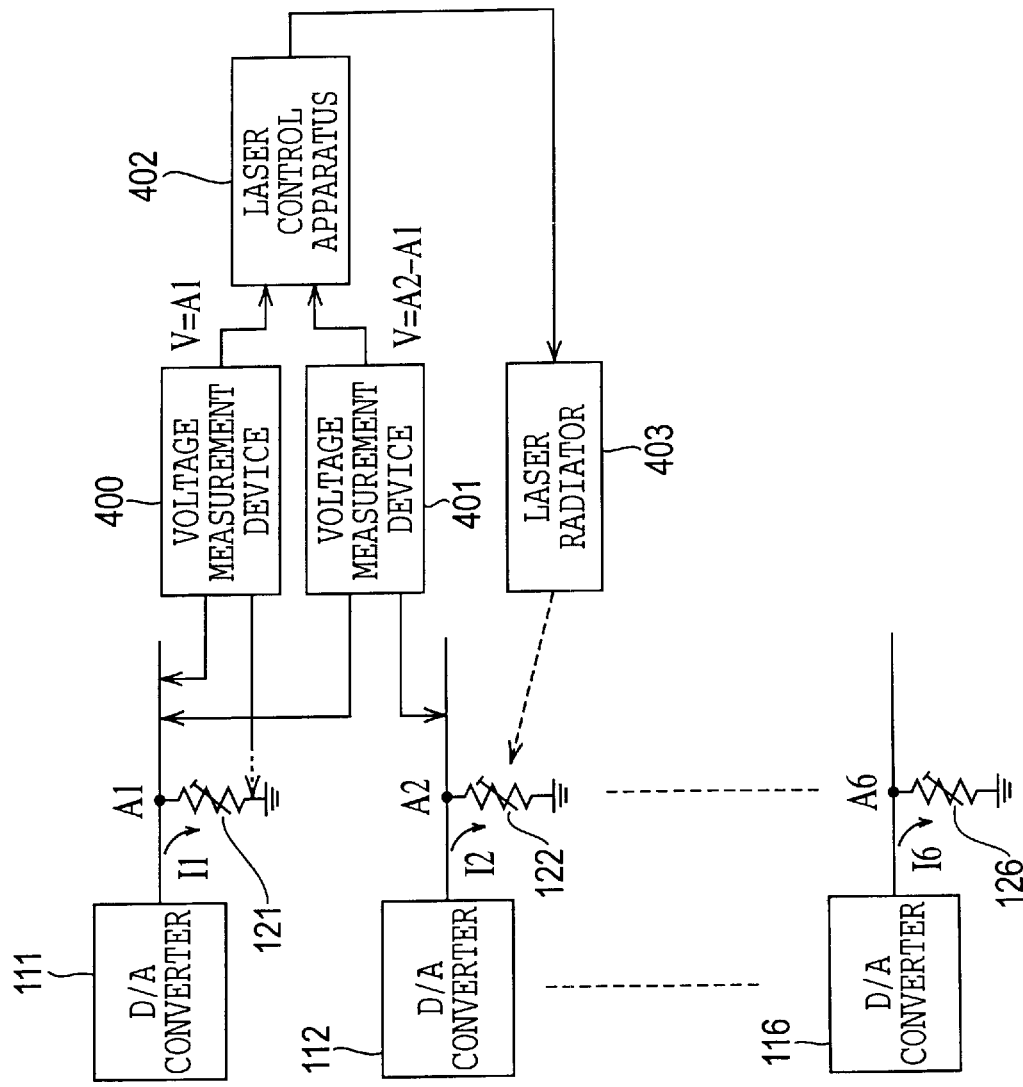
FIG. 6 is a block diagram of a laser-trimming device.

FIG. 6 is a block diagram illustrating a modification of the laser trimming method. FIG. 6 shows a step in which after laser trimming for the amplitude adjusting resistor 121 connected to the first D/A converter 111 is completed, laser trimming for the amplitude adjusting resistor 122 connected to the second D/A converter 112 is performed. The resistance value of the amplitude adjusting resistor 121 which is laser-trimmed first is set so that the output voltage A1 from the first D/A converter 111 to which a 100% input value is input falls within a predetermined voltage range. This setting is performed by using a voltage measurement equipment 400, a laser control device 402, and a laser radiator 403, shown in FIG. 6.

As shown in FIG. 6, during the laser trimming of the amplitude adjusting resistor 122 connected to the second D/A converter 112, the potential difference V=A2−A1 between the output of the first D/A converter 111 and the output of the second D/A converter 112 is measured by the voltage measurement equipment 401. At this time, of course, the same value is input to the first and second D/A converters 111 and 112. The laser control device 402 laser-trims the amplitude adjusting resistor 122 so that the potential difference V is within a predetermined allowable range, for example, nearly zero. Thereafter, laser trimming of the other amplitude adjusting resistors 123 to 126 may be performed so that the potential difference between each of the outputs A3 to A6 of the third to sixth D/A converters 113 to 116 and the output voltage A1 of the first D/A converter 111 becomes nearly zero.

This yields the advantage that the laser trimming step can be started quickly without waiting for the characteristics of the first to sixth D/A converters 111 to 116 and the amplitude adjusting resistors 121 to 126 to reach temperature saturation.

More specifically, since the first to sixth D/A converters 111 to 116 and the amplitude adjusting resistors 121 to 126 have temperature coefficients, if temperature is increased due to generated heat of parts with the passage of time, the voltages of the outputs A1 to A6 of the first to sixth D/A converters 111 to 116 vary with an increase in temperature. Therefore, as stated above, the measured voltage differs each time the amplitude adjusting resistors 121 to 126 connected to the first to sixth D/A converters 111 to 116 are laser-trimmed one by one. Therefore, in this case, it is necessary to wait for the characteristics of the first to sixth D/A converters 111 to 116 and the amplitude adjusting resistors 121 to 126 to reach temperature saturation.

On the other hand, according to this modification, for example, the output A1 of the first D/A converter 111, which is the reference, and, for example, the output A2 of the second D/A converter 112, which is an object for adjustment, are measured at the same time under equal temperature conditions. Therefore, it is not necessary to wait for the characteristics of the first to sixth D/A converters 111 to 116 and the amplitude adjusting resistors 121 to 126 to reach temperature saturation.

The D/A converter which is adjusted first is not limited to the first D/A converter 111 and can be selected as desired, and the adjustment sequence thereafter can be selected as desired.

(Modification of the Image Signal Processing Circuit)

Figure 7:
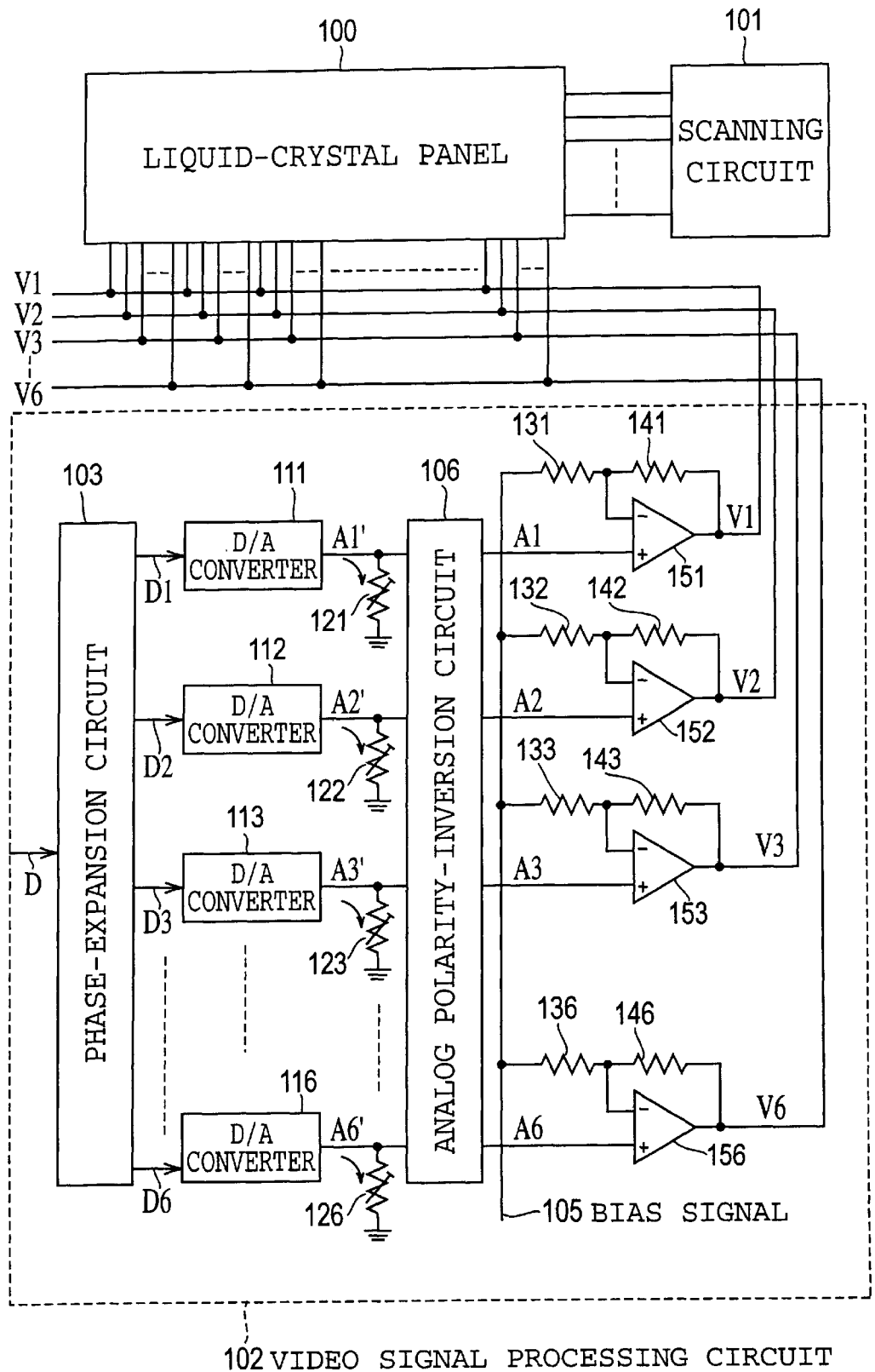
FIG. 7 is a block diagram showing a modification of FIG. 1.

Unlike the image signal processing circuit 102 shown in FIG. 1, a image signal processing circuit 102A shown in FIG. 7 includes an analog polarity-inversion circuit 106 in place of the digital polarity-inversion circuit 104. In this case, signals A1' to A6' output from the D/A converters 111 to 116 become analog image signals before the polarity is inverted. The analog image signals A1' to A6' are input to the analog polarity-inversion circuit 106, and analog image signals A1 to A6, the polarities of which are inverted in terms of positive and negative with respect to a particular reference potential at a predetermined cycle, are output therefrom. These analog image signals A1 to A6 are the same as that schematically shown in FIG. 8(C). In the above-described manner, the image signal processing circuit of the present invention may perform polarity inversion in either a digital or analog manner. In the image display apparatus shown in FIG. 7, the construction of the portions which are not specifically described are the same as that of the image display apparatus described with reference to FIG. 1.

(Description of an Electronic Apparatus)

Figure 9:
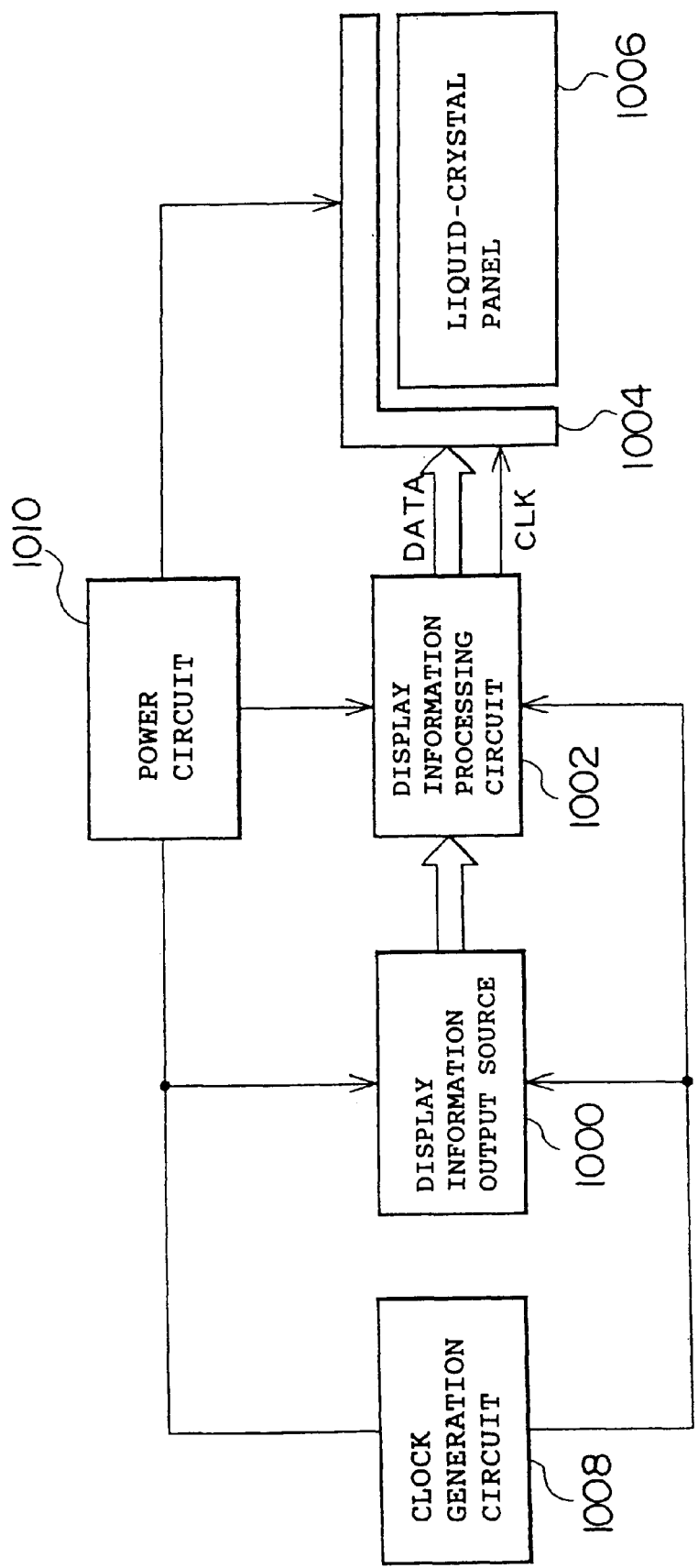
FIG. 9 is a block diagram of a liquid-crystal display apparatus, which is an example of an image display apparatus according to the present invention.

An electronic apparatus constructed by using the above-described liquid-crystal display apparatus comprises a display information output source 1000, a display information processing circuit 1002, a display driving circuit 1004, a display panel 1006 such as a liquid-crystal panel, a clock generation circuit 1008, and a power circuit 1010, shown in FIG. 9. The display information output source 1000 comprises memories, such as ROM and RAM, and a tuning circuit which tunes a television signal and outputs it, and outputs display information, such as image signals, in accordance with a clock from the clock generation circuit 1008. The display information processing circuit 1002 processes display information in accordance with the clock from the clock generation circuit 1008 and outputs it. This display information processing circuit 1002 is the same as the above-described image signal processing circuit 102. This display information processing circuit 1002 may further include a gamma correction circuit, and a clamp circuit or the like. The display driving circuit 1004 comprises a scanning-side driving circuit and a data-side driving circuit, and causes the liquid-crystal panel 1006 to be driven for display. The power circuit 1010 supplies power to each of the above-described circuits.

Figure 10:
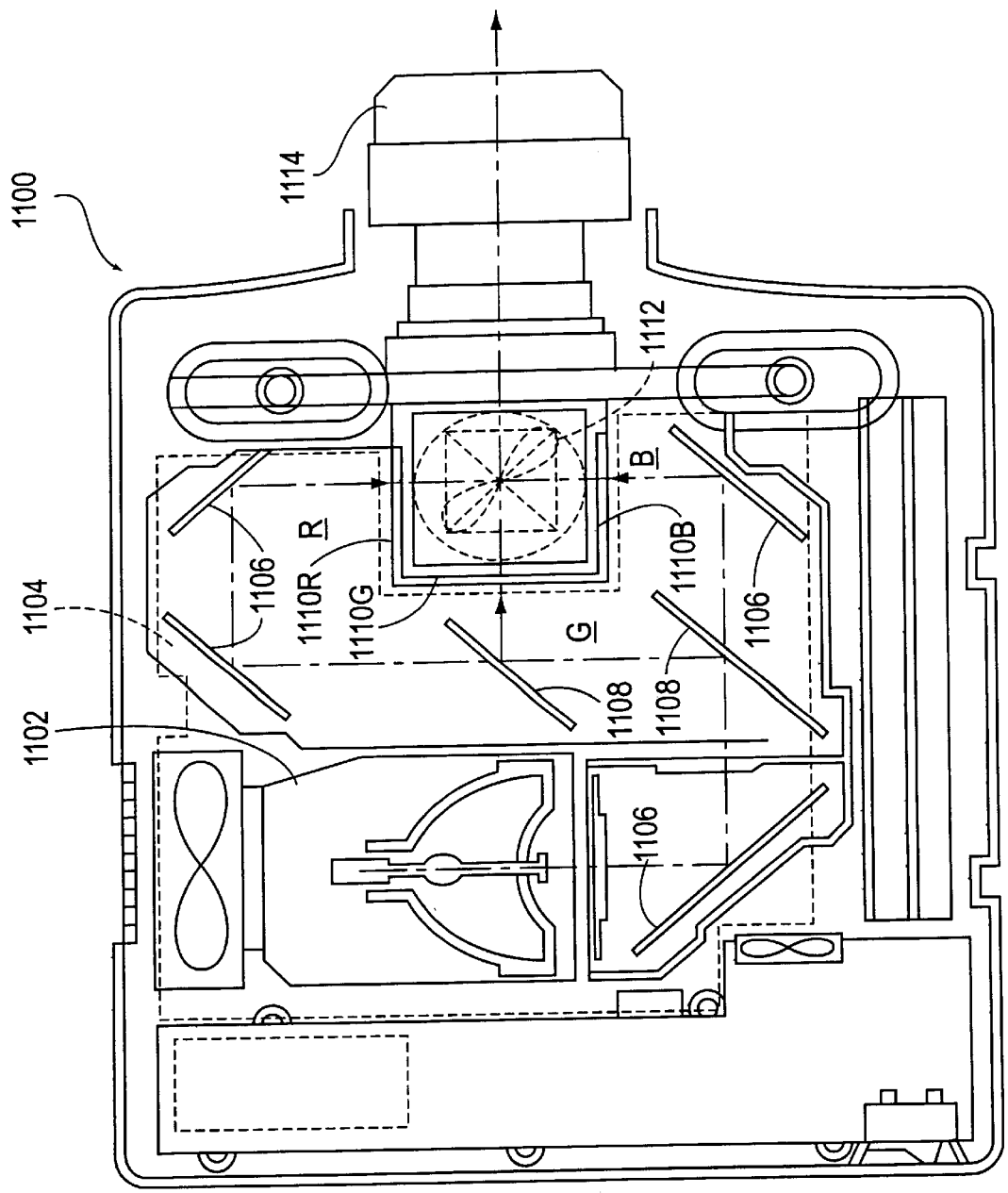
FIG. 10 is a schematic illustration of a color projector, which is an example of an electronic apparatus according to the present invention.
Figure 11:
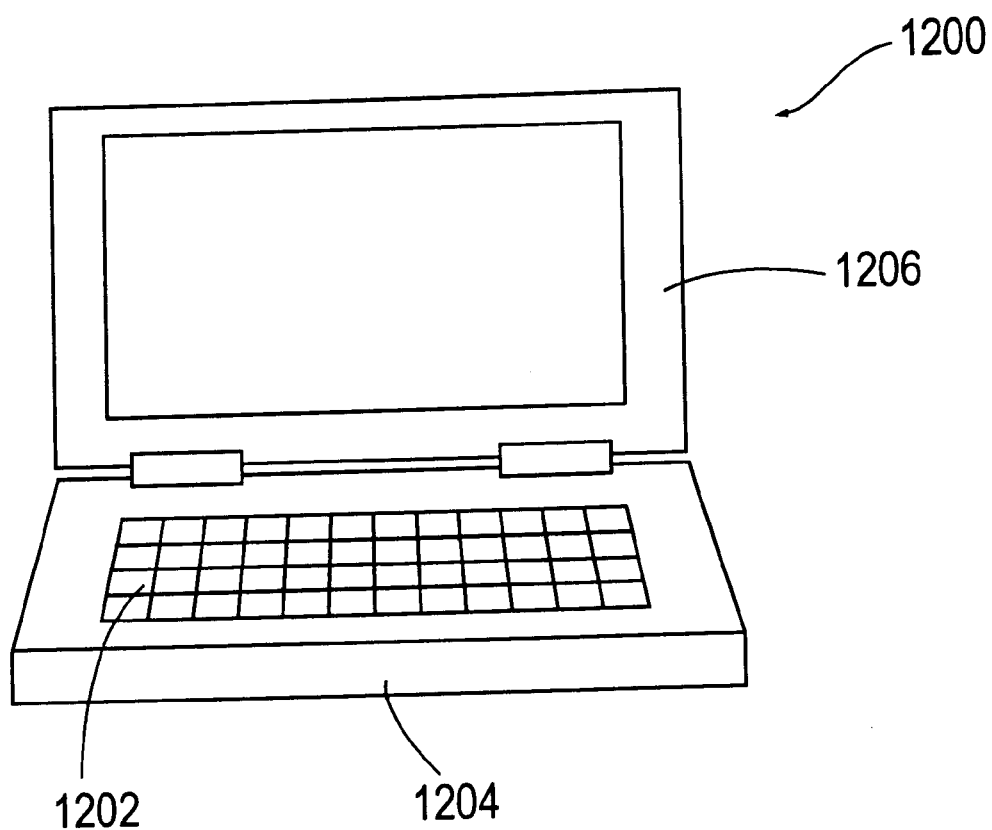
FIG. 11 is a schematic perspective view of a personal computer, which is an example of an electronic apparatus according to the present invention.
Figure 12:
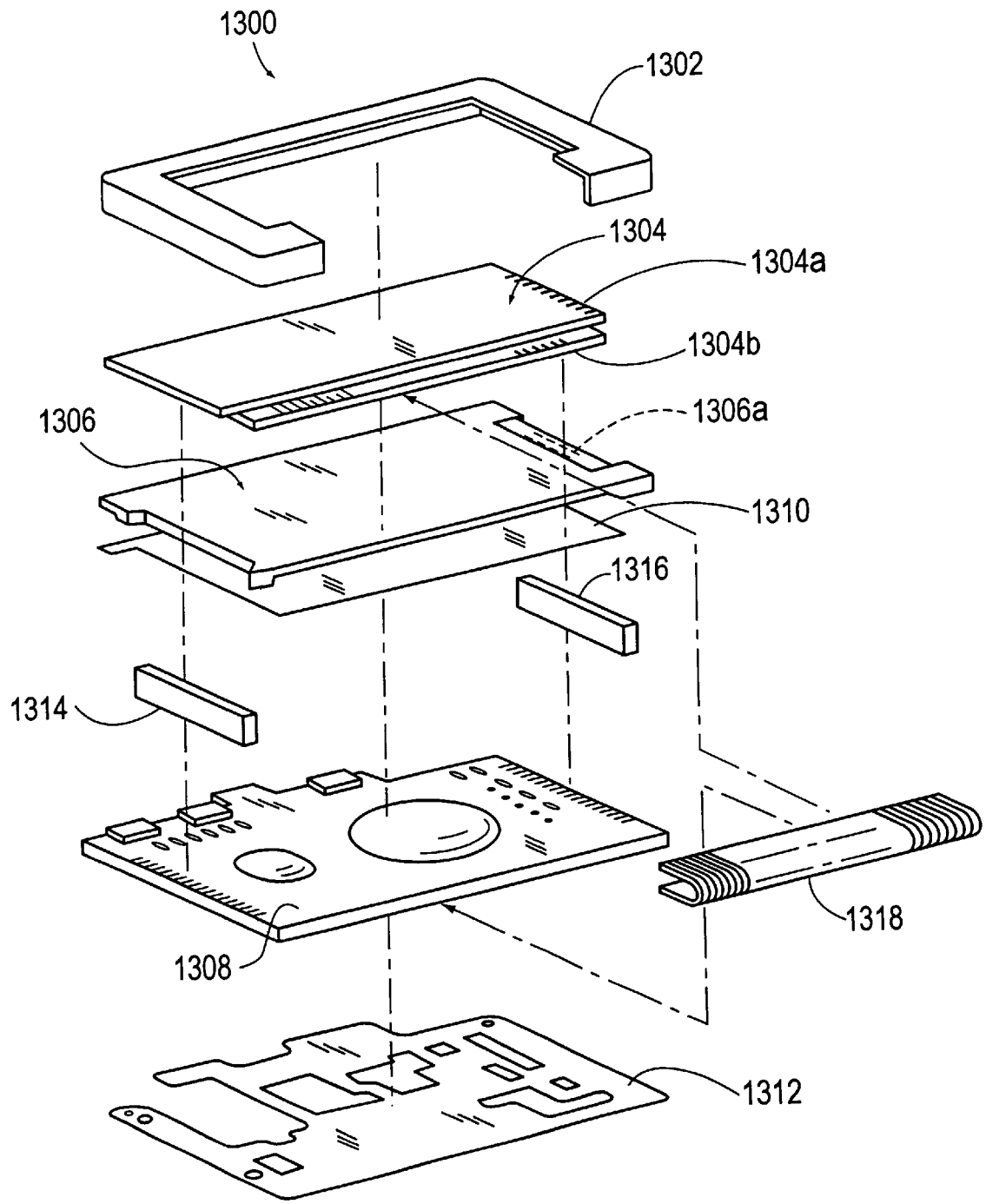
FIG. 12 is an exploded, perspective view of a pager, which is an example of an electronic apparatus according to the present invention.

Examples of an electronic apparatus having such a construction are a liquid-crystal projector shown in FIG. 10, a multimedia-compatible personal computer (PC) and an engineering workstation (EWS) shown in FIG. 11, and a pager shown in FIG. 12, or portable telephone, a word processor, a television, a viewfinder-type or monitor-direct-view-type image tape recorder, an electronic notebook, an electronic desktop calculator, a car navigation apparatus, a POS terminal, and an apparatus having a touch panel.

The liquid-crystal projector shown in FIG. 10 is a projection-type display apparatus in which a transmissive type liquid-crystal panel is used as a light valve, for example, an optical system of a prism method is used. In FIG. 10, in a projector 1100, projection light emitted from a lamp unit 1102 for a white light source is separated into three primary colors of R, G, and B by a plurality of mirrors 1106 and two dichroic mirrors 1108 inside a light guide 1104, and are guided into three liquid-crystal panels 1110R, 1110G, and 1110B which display a picture of respective colors. The light which is modulated by the respective liquid-crystal panels 1110R, 1110G, and 1110B is made to enter a dichroic prism 1112 from three directions. In the dichroic prism 1112, since light of red R and blue B is bent 90°, and light of green G travels straight, picture of each color are combined, and a color picture is projected onto a screen or the like through a projection lens 1114.

A personal computer 1200 shown in FIG. 11 includes a main unit section 1204 having a keyboard 1202, and a liquid-crystal display screen 1206.

A pager 1300 shown in FIG. 12 includes, within a metal frame 1302, a liquid-crystal panel substrate 1304, a light guide 1306 having a backlight 1306a, a circuit substrate 1308, first and second shield boards 1310 and 1312, two elastic conductors 1314 and 1316, and a film carrier tape 1318. The two elastic conductors 1314 and 1316 and the film carrier tape 1318 are used to connect the liquid-crystal panel substrate 1304 to the circuit substrate 1308.

Here, in the liquid-crystal panel substrate 1304, liquid crystal is sealed between two transparent substrates 1304a and 1304b, thereby at least a matrix-type liquid-crystal display panel is formed. On one of the transparent substrates, the driving circuit 1004 shown in FIG. 9 or, in addition to this, the display information processing circuit 1002, may be formed. The circuit which is not mounted onto the liquid-crystal panel substrate 1304 is an external circuit of the liquid-crystal panel substrate, and in the case of FIG. 12, the circuit can be mounted onto the circuit substrate 1308.

Figure 13:
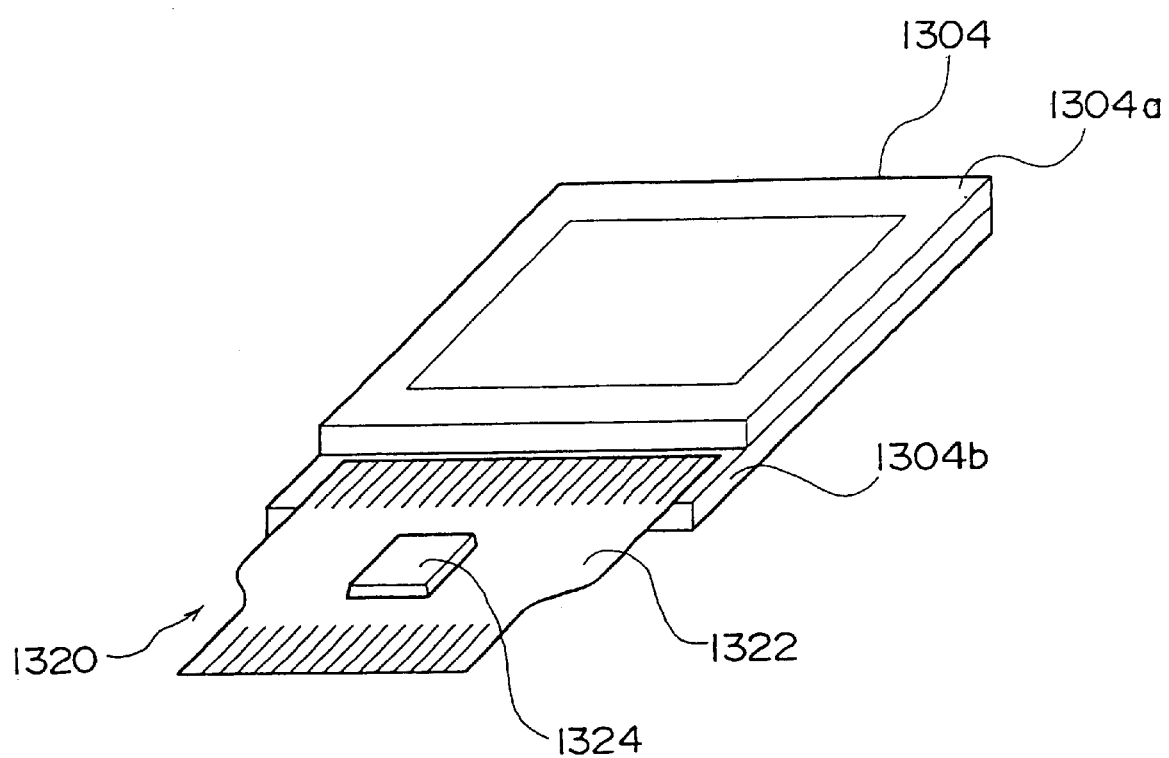
FIG. 13 is a schematic perspective view showing an example in which an image signal processing circuit according to the present invention is mounted in TCP.

Since FIG. 12 shows the construction of a pager, besides the liquid-crystal panel substrate 1304, the circuit substrate 1308 is required. When a liquid-crystal display device is used as a part for an electronic apparatus and when a display driving circuit or the like is mounted onto the transparent substrate, the smallest unit of the liquid-crystal display device is the liquid-crystal panel substrate 1304. Or, the liquid-crystal panel substrate 1304 fixed to the metal frame 1302 serving as a housing may be used as a liquid-crystal display device which is a part for an electronic apparatus. Furthermore, in the case of a backlit-type, a liquid-crystal display device may be constructed by incorporating the liquid-crystal panel substrate 1304 and the light guide 1306 having a backlight 1306a. Instead of these, as shown in FIG. 13, a TCP (Tape Carrier Package) 1320 in which an IC chip 1324 is mounted onto a polyimide tape 1322 on which a metal conductive film is formed is connected to one of the two transparent substrates 1304a and 1304b which constitute the liquid-crystal panel substrate 1304, and may be used as a liquid-crystal display device which is a part for an electronic apparatus.

The present invention is not limited to the above-described embodiments, and various modifications are possible within the spirit and scope of the present invention. For example, in addition to an apparatus which is applied to the driving of the above-described various liquid-crystal panels, the present invention may be applied to an electroluminescence device, a plasma display device, and a digital mirror device, which are other electro-optical apparatuses.

What is claimed is:

1. An image signal processing circuit, comprising:
a serial-parallel converter for converting a serial digital image signal into N parallel digital image signals;
N digital-analog converters for converting said N parallel digital signals into respective analog image signals;
N amplifiers for amplifying and outputting said analog image signals from said N digital-analog converters, respectively; and
N sets of gain setting resistors, connected to said respective N amplifiers, for setting respective gains of said N amplifiers, each of said N sets of gain setting resistors including first and second resistors, and said first and second resistors being formed on a first substrate in a same manufacturing step so that the resistance value of each of said N sets of gain setting resistors need not be adjusted.

2. The image signal processing circuit according to claim 1, further comprising N amplitude adjusting resistors, connected to said N digital-analog converters, for adjusting the amplitude of each of said analog image signals, a resistance value of each of said N amplitude adjusting resistors being adjusted by laser trimming so that an amplitude of each of said analog image signals which are input to said N amplifiers is substantially equal.

3. The image signal processing circuit according to claim 1, a signal being output such that the polarity of a voltage applied to a pixel is inverted at a predetermined cycle is output from each of said N amplifiers, and a digital polarity-inversion circuit for inverting the polarity of said parallel digital image signal in a digital manner at every said predetermined cycle being provided between said serial-parallel converter and said N digital-analog converters.

4. The image signal processing circuit according to claim 1, a signal being output from each of said N amplifiers such that a polarity of a voltage applied to a pixel is inverted at a predetermined cycle, and an analog polarity-inversion circuit for inverting the polarity of said parallel analog image signals in an analog manner at every said predetermined cycle being provided between said N digital-analog converters and said N amplifiers.

5. The image signal processing circuit according to claim 3, each of said N amplifiers being formed of an operational amplifier having first and second input terminals, said analog image signal whose amplitude is adjusted by amplitude adjusting resistors is input to said first input terminal of said operational amplifier, and a polarity inverting bias signal is input to said second input terminal of said operational amplifier.

6. The image signal processing circuit according to claim 1, k(1<k≦N) sets of said gain adjusting resistors being disposed on said first substrate.

7. The image signal processing circuit according to claim 6, further comprising a circuit package in which said first substrate and said k sets of gain adjusting resistors are housed inside a resin mold with a plurality of terminals connected to said k sets of gain adjusting resistors being exposed.

8. An image signal processing circuit, comprising:

a serial-parallel converter for converting a serial digital image signal into N parallel digital image signals;

N digital-analog converters for converting said N parallel digital image signals into respective analog image signals;

N amplifiers for amplifying and outputting said analog image signals from said N digital-analog converters, respectively;

N sets of gain setting resistors, connected to said respective N amplifiers, for setting respective gains of said N amplifiers;

a first circuit package having housed therein said first substrate and k(1<k≦N) sets of said gain adjusting resistors in a resin mold with a plurality of first terminals connected to said k sets of gain adjusting resistors being exposed;

a second circuit package having housed therein k sets of said amplifiers in a resin mold with a plurality of second terminals connected to said k amplifiers being exposed; and a main substrate having mounted thereon said first circuit package and said second circuit package, said main substrate having a wiring pattern formed on both sides thereof, and a plurality of through holes which pass through said main substrate, and said first circuit package being mounted on one side of said main substrate, said second circuit package being mounted on a second side of said main substrate, and said plurality of first and second terminals being connected to each other through said plurality of through holes.

9. The image signal processing circuit according to claim 8, said first circuit package and said second circuit package being mounted at opposing positions with said main substrate in between.

10. The image signal processing circuit according to claim 8, further comprising a third circuit package in which said k digital-analog converters and said k amplitude adjusting resistors are housed, said third circuit package being mounted on said main substrate.

11. An image signal processing circuit, comprising:

a serial-parallel converter for converting a serial digital image signal into N parallel digital image signals;

N digital-analog converters for converting said parallel digital image signals into respective analog image signals;

N amplifiers for amplifying and outputting said analog image signals from said N digital-analog converters, respectively; and N sets of gain setting resistors, connected to said respective N amplifiers, for setting respective gains of said N amplifiers, each of said N sets of gain setting resistors including first and second resistors, k(1<k≦N) of said first resistors formed on a first substrate in a same manufacturing step, and k of said second resistors formed on a second substrate in a same manufacturing step.

12. The image signal processing circuit according to claim 11, further comprising N amplitude adjusting resistors, connected to respective output lines of said N digital-analog converters, for adjusting the amplitude of each of said analog image signals, a resistance value of each of said N amplitude adjusting resistors being adjusted by laser trimming so that the amplitude of each of said analog image signals which are input to said N amplifiers is substantially equal.

13. An image display apparatus, comprising:

an image signal processing circuit according to claim 1; and an electro-optical device which is driven in accordance with an analog image signal output from said image signal processing circuit.

14. An electronic apparatus comprising a image display apparatus according to claim 13.

15. An image display apparatus, comprising:

an image signal processing circuit according to claim 8; and an electro-optical device which is driven in accordance with an analog image signal output from said image signal processing circuit.

16. An image display apparatus, comprising:

an image signal processing circuit according to claim 11; and an electro-optical device which is driven in accordance with an analog image signal output from said image signal processing circuit.

* * * * *

UNITED STATES PATENT AND TRADEMARK OFFICE
CERTIFICATE OF CORRECTION

PATENT NO.      : 6,452,526 B2
DATED           : September 17, 2002
INVENTOR(S)     : Takahiro Sagawa et al.

It is certified that error appears in the above-identified patent and that said Letters Patent is hereby corrected as shown below:

<u>Title page,</u>
Item [54], please replace the title to read -- IMAGE SIGNAL PROCESSING CIRCUIT, IMAGE DISPLAY APPARATUS AND ELECTRONIC APPARATUS USING THE SAME, AND METHOD OF ADJUSTING OUTPUT OF DIGITAL-ANALOG CONVERTER --.

Signed and Sealed this

First Day of April, 2003

JAMES E. ROGAN
*Director of the United States Patent and Trademark Office*